United States Patent [19]

Muguet

[11] Patent Number: 4,787,063

[45] Date of Patent: Nov. 22, 1988

[54] ACQUISITION AND TRANSMISSION SYSTEM FOR A RECORDER AND A COMPUTER CENTER

[76] Inventor: Francis Muguet, 71, rue du Commerce, 75015 Paris, France

[21] Appl. No.: 787,975

[22] Filed: Oct. 16, 1985

[30] Foreign Application Priority Data

Oct. 19, 1984 [FR] France ............................... 84 16077
Mar. 19, 1985 [FR] France ............................... 85 04012

[51] Int. Cl.[4] .............................................. G06F 1/00
[52] U.S. Cl. .................................................. 364/900
[58] Field of Search ... 364/200 MS File, 900 MS File, 364/300; 360/33.1

[56] References Cited

U.S. PATENT DOCUMENTS 4,581,484  4/1986  Bendig .......................... 364/900 X
4,604,699  8/1986  Borcherdt et al. ............. 364/900 X

FOREIGN PATENT DOCUMENTS 3138648  4/1983  Fed. Rep. of Germany.

OTHER PUBLICATIONS

Rundfunktechnische Mitteilungen, vol. 26, No. 6, Nov.-Dec. 1982, pp. 254-257, Norderstedt, DE, G. Hoffman et al., "Videotext Programmiert Videorecorder",*En entier*.
IEEE International Conference on Communications, vol. 3, RAI Congress Centre, Amsterdam, May 14-17, 1984; pp. 1414-1419, IEEE North Holland, Amsterdam, NL, H. Armbruster: "Systems for Information Retrieval Over Wideband Networks", *Paragraph 2*.
IEEE Spectrum, Oct. 1979, pp. 61-66, New York, U.S., E. B. Carne: "Wired Household".
Japan Telecommunications Review, vol. 23, No. 3, Jul. 1981, pp. 243-249, Tokyo, Japan, J. Magara et al., "Advanced Video Response System—Phase III".
Research Disclosure, No. 243, Jul. 1984, pp. 314-320, No. 24309, Havant, Hampshire, Great Britain; "Control Arrangement and Method for Video Tape Recorder".
ICC'84 Links for the Future Science, Systems & Services for Communications, IEEE International Conference on Communications, 14-17 May, 1984, Amsterdam, Proceedings, vol. 3, ed. P. DeWilde et al., pp. 1414-1419, IEEE/Elsevier Science Publisherss B.Vd., North Holland, Amsterdam, NL, H. Armbruster, "Systems for Information Revtrieval Over Wideband Networks"—paragraph 2.
Data Communication and Computer Network, Proceedings of the IFIP (TC-6)/CSI Conference on Networks 80, Bombay, India, Feb. 4-6, 1981; Ed. S. Ramani, pp. 17-30; North Holland Publishing Company, Amsterdam, NL; P. E. Jackson: "Services and Architecture for Network Information Systems".

*Primary Examiner*—Raulfe B. Zache
*Attorney, Agent, or Firm*—McAulay, Fields, Fisher, Goldstein & Nissen

[57] ABSTRACT

The invention relates to a system transmitting special signals and data between a computer center and an appliance which is able to receive and record independently video and/or audio programs produced by television or radio companies.

The system has two inter-related components: data-acquisition system which helps the user in the scheduling task, and an additional real time start/stop recording system. The data-acquisition system includes a computer center, an interactive data network to which is connected a modem. The modem is connected through an interface to the timer of the videorecorder, and also to a terminal with a screen and a keyboard. Special codes are sent by the computer center to the interface in order that the timer is scheduled to record the programs that the user have selected while accessing to the computer center. Among the codes are included special identification codes used by the real time start/stop system and which are defined by the computer.

20 Claims, 3 Drawing Sheets

ACQUISITION AND TRANSMISSION SYSTEM FOR A RECORDER AND A COMPUTER CENTER

BACKGROUND OF THE INVENTION

At the present time, in accordance with the conventional way of scheduling a videorecorder, a user has to read in a magazine the hours, channels, titles, abstracts, and other features of the program. Then, the user has to enter the channels, the hours of start and stop of chosen programs, by hand onto a videorecorder keyboard.

It is a long, tedious and not error-free process, the result of which is not accurate, because the TV companies do not broadcast (air or cable) their programs in compliance with the published hours in time-tables. As a result, if a user does not want to miss a part of a program, he must schedule the videorecorder with a margin of 5 to 10 minutes. Furthermore, the conventional way is less and less convenient, with the increasing number of TV channels (air, cable, satellite), some with different local times.

The problem of easily scheduling the videorecorder, and the problem of accurately starting and stopping a recording of the videorecorder has to be considered as a whole because it is not possible to consider a scheduling process if one does not know when the recording is to start or stop. Also, the video recorder cannot stop or start without knowing upon which parameter the videorecorder has to stop and start. In a conventional way, the scheduling method uses the published hours, and the keyboard of the videorecorder. The hourly start/stop record method compares the published hours stored before, and the time of the clock in the videorecorder's timer.

Up to the present, several systems were proposed in order to solve the general problem of helping the user in such a way, so that one can easily and accurately schedule the videorecorder.

In France, the CCETT (Centre Comm. d'Etudes de Telediffusion et al Telecommunication) laboratories have suggested a system called EPEOS and also known as MOISE (Messagerie de Programmes Organisee par l'identification des Sources et de leurs Emissions). This system works with the help of a modified ANTIOPE magazine. For each TV channel the user calls in a broadcast ANTIOPE magazine. The data broadcast then occurs, for each TV channel, during the blanking interval of each TV channel. The user makes an un-interactive choice of the programs he wants. The ANTIOPE protocol and terminal are modified in order for the user to be able to define and address, among the ANTIOPE data, sub-articles related to a specific program description. The user picks out the chosen program with the help of an index (a mouse) which is moved on the screen. The MOISE system does not use a straightforward start/stop scheme.

In accordance with the MOISE system, two articles, one describing the program on the air, the other describing the next program to be aired, are broadcast three times a second. Each article contains the program mnemonic, hour and duration. The hour and duration are permanently updated in accordance with the programs' real execution. The two articles are indirect start/stop broadcast codes. Within the system, it is compulsory to synchronize the timer clock. The start/stop recording is made through a comparison of the timer clock time with the stored hour which can be changed by the broadcast articles.

VPS (Video Programming System) is a system proposed in the Federal Republic of Germany by the television channels ARD/ZDF. It has been in use since August 1985. Succinctly, the system consists in broadcasting a label or digital signal related to a program meanwhile the program is aired. If the label is corresponding to the label of a chosen program, then the program is recorded. The digital broadcast of the label is made for all the duration of the program, onto the line 16. In the beginning, the conceivers of VPS have envisioned a data acquisition system through a bar-code reader. The bar-codes would have been printed onto the German newspapers, but the German press opposed it, for a lot of reasons. The final and only solution was then to broadcast the supposed-to-be starting hour of the program as the label. If the program is late, VPS broadcasts the supposed-to-start hour, with a get-ready-to-record signal, until the program really does start. The user schedules the programs' recording onto the keyboard of the VCR in the same way as the old way of scheduling. There is no real improvement to help the user to schedule his VCR.

To cope with these problems, the ARD/ZDF are thinking of upgrading the VPS system to the VPV system. Basically, the VPV is a VPS of which the data acquisition system is a CEEFAX broadcast videography. It is interesting to notice that the CEEFAX and the VPS digital broadcast schemes are not compatible.

An ARD/ZDF data acquisition system through a broadcast viedography has been publised in a paper (Rundfunktecknische Mitteilungen Vol. 26 1982. Nov-Dec.: Videotext programmiert videorecorder, Hofman et al.). By its technical principles and capabilities, it is completely different from the system in accordance with the invention which uses a computer network. Following this paper, it is interesting to notice that its authors think that only the television companies can solve the problems of the real start/stop recording system. It will be shown that my system bypasses the principle of the intervention of the television companies which have plagued all the previous systems.

Because of their technological principles, in these previous systems, the digital codes broadcasting process is managed by the television companies, as regards only their own television program broadcast. In the MOISE and VPV systems, the data acquisition system, i.e., the broadcast videography magazine, is managed also by the television companies.

All the above systems are not universal, from their very principle. There is no way to force all the television companies to use one of these previous systems.

SUMMARY OF THE INVENTION

The present invention is yet another approach to the problem of starting the recording of scheduled programs, on the real and correct time. The invention provides a general user-friendly scheduling system which can be upgraded to a universal scheduling and real-time recording stop/start system.

The invention relates to a system transmission of special signals and data between a computer center and an appliance which is able to receive and to record independently video and/or audio programs produced by the television and radio companies.

The appliance is thus also composed with a tuner and a receiver (broadcast TV) or a connection system (cable TV). It is underlined that the computer center does not act as a video or audio data bank over a wide-band network, and in that case, the inner notion of timer and scheduling would be useless. The transfer rate is not of the same magnitude. Moreover, in my system, the appliance is not connected to the computer center when the recording process does occur.

For example, the appliance may be a VCR (audio and video), an erasable digital laser disk (video and/or audio), a tape recorder (audio) or a MAVICA+recording system (video).

The system has two inter-related components: a data-acquisition system which helps the user in his scheduling task, and an additional real time start/stop recording system.

The data-acquisition system includes a computer and an interactive computer network which is connected to a modem. The modem is connected, through an interface, to the timer of the VCR, and also to a terminal with a screen and a keyboard. The data related to the scheduling are exchanged through the interactive network.

In accordance with the additional real time recording start/stop system, the signals and data related to the start/stop system, i.e., beginning or end of the recording of programs from all television channels, are broadcast on an independent specialized channel with the help of an independent program monitoring center. The data stored in the timer during the scheduling process are used to identify the start/stop broadcast codes related to the chosen programs.

DETAILED DESCRIPTION OF THE INVENTION

Figure 1:
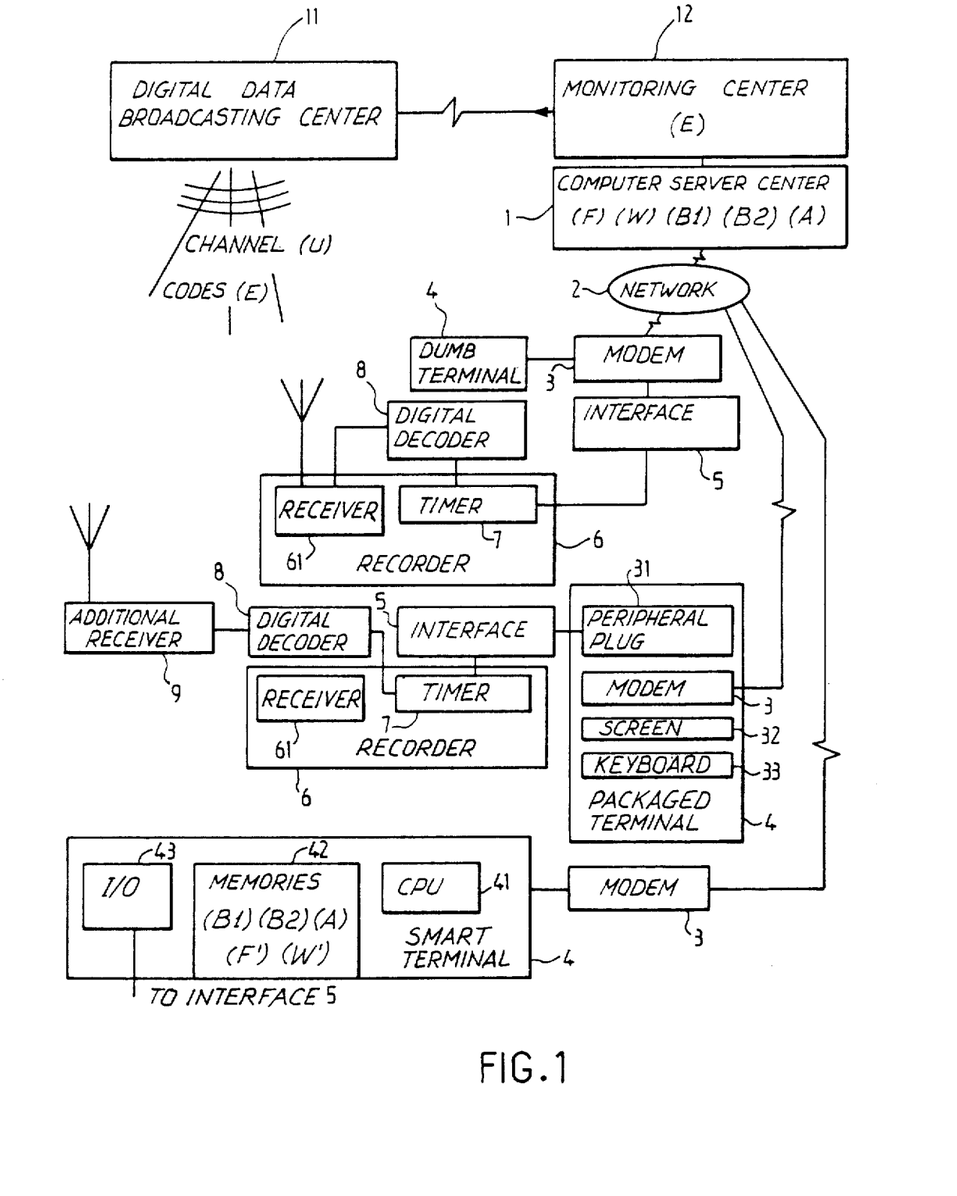
FIG. 1 is a schematic diagram of a data acquisition system and an additional real time recording start/stop system.

The data acquisition apparatus in accordance with the invention comprises (see FIG. 1):

1. an interactive data network (2);
2. one or several computer centers (1) acting as a server, and connected to the network (2), the computers have, placed into its memories, the set of computer instructions, codes describing the different methods of implementing the system, and other useful data;
3. a modem (3) connected directly or indirectly to the network (2);
4. a terminal (4) with a display device and a data acquisition device, such as a screen and a keyboard, for example. The terminal (4) is connected to the modem (3). In accordance with a most preferred embodiment, the terminal (4) can be a wholly packaged telecommunicatyion terminal including the modem (3), a screen (32), a keyboard (33) and a peripheral plug (31);
5. an appliance, such as a recorder, (6) able to receive and to record independently video and/or audio programs broadcast by the television or radio companies. The appliance or recorder (6) includes a timer (7). Such an appliance could be a VCR, an erasable laser disk with a receiver, a tape recorder with a tuner; and
6. an intelligent component (5), especially conceived, means for an interface between the timer (7) and the modem (3), or the peripheral plug (31).

The number of computer centers (1) or networks (2), unless there is one of each, does not matter. A well known example of a wholly packaged and low-cost telecommunication terminal is the French MINITEL, which is used in the TELETEL network.

The computer center (1) includes a central processing unit and main or auxilliary memories. In the memories there are:

1. the computer programs or the set of instructions which describe the different methods of implementing the devices of the system, i.e., setting the devices together to work, and also the codes (A) used to identify and to establish a link between the interface (5) and the computer center (1);
2. the codes (B1) of the input language and the codes (B2) of output language of the interface (5); it will be shown further that, according to the layout of the interface (5), the codes (B1) and (B2) may be different; and
3. a data base (W) in which are stored information about the television or the radio programs for the next weeks. The information about a TV program includes the characteristics such as the channel number or frequency, the forecast start/stop time, and also, as a very interesting optional feature, the codes (F) which allows the indentification of the real time start/stop broadcast (E) codes. The definition of the TV programs is carried out independently, by the computer center, and it is possible to define programs or subprograms in a way not found in the official time-tables of the television or radio companies.

The apparatus as afore-described can be implemented and used to help the user in his task of scheduling his appliance (6), most often a VCR.

One way of helping the user is to make the access to the TV programs' information easier, and to make the process of selecting programs and scheduling programs almost simultaneous and with no additional operations.

The user may access, through his terminal (4) and the network (2), to the data base (W), and then, with the help of whatever good interrogation software, selects the TV programs he wants to record. The selections have to be made, while taking into account that there is no way to record two programs in the same time frame. The user forms a set (w) of the programs he wants to record.

First, the (A) codes are used by the computer center (1) to establish a link between the computer center (1) and the interface (5). The interface (5), upon receiving the (A) codes, knows that that interface is addressed by the computer (1). As the timer (7) of the appliance (6) is an unusual device to be connected to a computer, there are no norms about (A) codes. In a most preferred embodiment, the interface (5) acknowledges with specific (A1) codes; it is only after the computer center (1) has received these (A1) codes that the data exchange could begin. For security reasons, another exchange of acknowledged codes could be considered. Another very simple solution, but not as sophisticated and user-friendly, is to send a message to the user, telling the user to connect the interface (5) with the modem (3). In that case, the (A) codes are the message text, and there could be an acknowledged answer keyed by the user.

With the help of the computer center (1), the next step of the method is to assemble and combine (T1 operation):

1. the set (w) and, more precisely, the characteristics of the chosen programs, i.e., the channel references, the forecast start/stop hours and, as a preferred option, the (F) identification codes; and 2. the codes (B1) of the input language which commands the interface (5) and the timer (7).

The result of the computation (T1) is the set of (c) codes, which is sent over the network (2) to the interface (5). In this way, the scheduling process is performed automatically. Then, the interface (5) acknowledges the process and asks the computer center (1) for disconnection.

Following each kind of interface and model of videorecorder, the codes (B1), the computation (T1) and the result (c) would be different.

It is also possible to prepare the computation in advance. Once every week, or every two weeks, with the help of a computer center (1), a preparatory step is to assemble and combine (T2 operation), as follows:

1. the whole data base (W) and, more precisely, the characteristics of the chosen programs, i.e., the channel references, the forecast start/stop hours, and, as a preferred option, the (F) identification codes; and 2. the codes (B1) of the input language which commands the interface (5) and the timer (7).

The result of the computation (T2) is the set of (C) codes which can be appended to the data base (W).

Then, as soon as the user has selected the programs he wants to record, the only operation is to extract the set (w) as a subset of (W).

Another interesting feature is that the apparatus can be implemented and used in order to know and verify the titles of the programs which are scheduled to be recorded on the user's appliance (6).

With the help of the (B1) codes, the first step of the method is to prepare (operation T4) the interrogation control codes, in order that the interface (5) can receive or access the content of the memories of the timer (7). This step can be done, once and for all, for each model of videorecorder.

After a user has accessed the computer center (1), the user tells the computer center (1) that he wants to read the titles, and/or other information about the program scheduled to be recorded by his videorecorder (6).

Then the computer center sends the interrogation codes, over the network (2) to the interface (5). The interface (5) then could read the (d) codes stored in the memories of the timer (7). Another way is to make the timer (7) display the data and to catch the (d) display data.

The interface (5) then transmits the (d) codes over the network (2).

The next step of the method (operation T5) is to analyze the (d) codes with the help of the (B2) codes describing the output language of the interface (5), and to de-assemble or extract the hours, dates, channel references and better the (F) identification codes of the scheduled TV programs. Then, knowing these characteristics of the TV program, it is easy to find out the titles and other information of the TV program, through a cross-check in the data base (W).

Then, the computer center (1) send the titles or other relevant information, over the network (2), onto a display unit such as a screen (32) or a printer. In case two TV programs are scheduled to be recorded at the same time, the computer center sends a warning to the user.

A peculiar case is when the user has not only a dumb telecommunication terminal even packaged like a MINITEL, but a smart terminal or a microcomputer (4), with a central processing unit (41) and main memory, with an auxilliary memory (42) like diskettes or tapes or laser disks, with an I/O module (43) (see FIG. 1).

The methods afore-described can be used, but other methods can be used to implement the apparatus when the user has a smart terminal.

In a MINITEL, there are a screen module (32), a keyboard module (33), a peripheral plug module (31), a modem module (3). Through a protocol language, the remote server computer center (1) can control the links between the different modules; in this way, the modem module may be linked with the peripheral module. In a microcomputer, usually the process is slightly different; the modem is connected to the bus of the microcomputer, and then the data is handled by the CPU, and directed by the CPU (41) to an I/O card (43) and the peripheral module (43).

Once and for all, the (B1) codes related to the videorecorder's use may be stored in the memory (42). Once a week or once every two weeks, for example, the computer center (1) loads the data base (W) onto the memory (42) of the microcomputer (41), so that the smart terminal has the copy (W') of the data base (W) in its memory (42). Then the microcomputer (41) acts exactly as the computer center (1), as regards the interface (5). In this way, the two data acquisition methods aforedescribed could be adapted.

According to an alternative solution, the computer periodically loads the data base (W) and the (C) codes related to the user's videorecorder. Then the microcomputer (41) acts exactly as the computer center (1), as regards the interface (5). Then, only one oft the data acquisition methods afore-described could be adapted.

Once and for all, the (B2) codes must be stored in memory (42). Once a week, or once every two weeks, for example, the computer center (1) loads the data base (W) onto the memory (42) of the microcomputer (41), then the microcomputer (41) acts exactly as the computer center (1), as regards the interface (5).

In fact, it is not sure that the economics of such methods are good, unless the user spends a very long time making his TV programs' choice. The time of loading the whole data base (W) could be longer than the time elapsed while the user makes his choice. The VCR manufacturers could also be reluctant to let the (B1) codes and/or the (B2) codes be used or modified by Jack-of-all-the-trades.

One way of carrying out the interface (5) is now described with reference to the drawing (FIG. 2) which illustrates only one specific embodiment.

Figure 2:
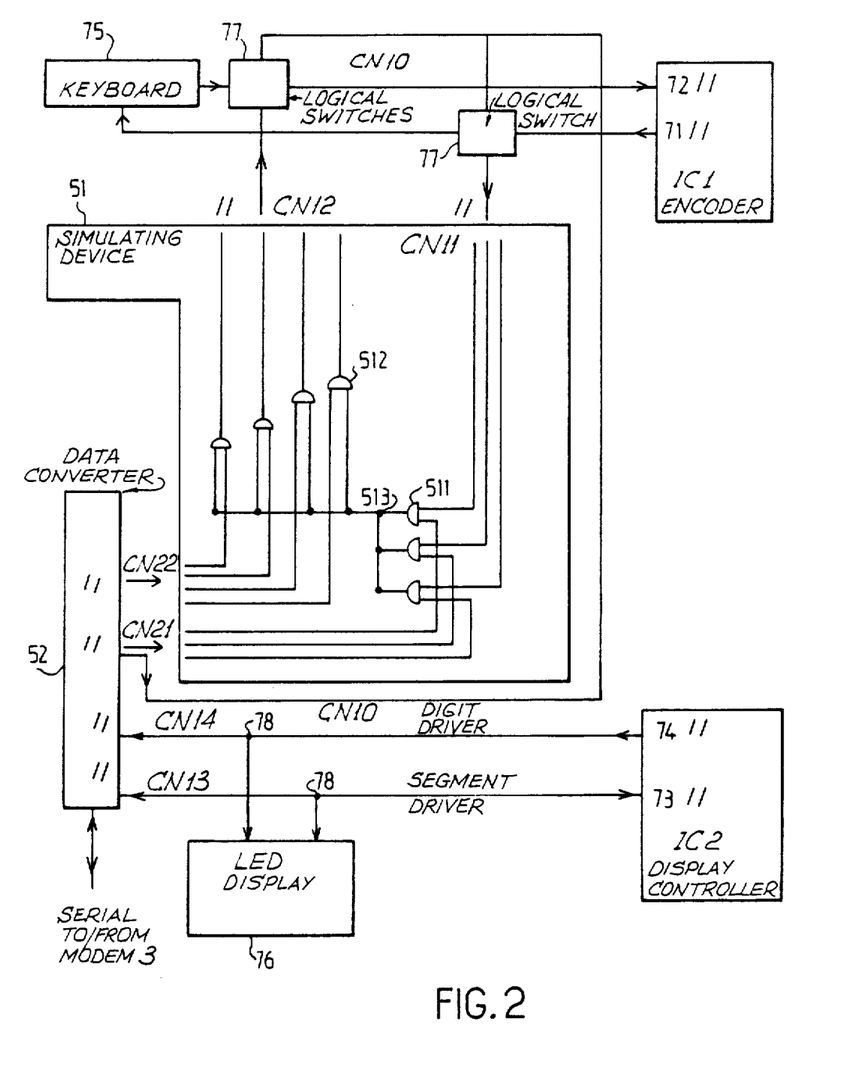
FIG. 2 is a diagrammatic representation of the layout of the electronic components of an example of a specific embodiment of a timer interface.

Typical keyboards of electronic appliances use most often a matrix-scanning technique. The basic layout is a matrix of wires with normally open momentary-contact switches at each intersection. Each switch is referenced by its row and column. There is one input port for the rows and one output port for the columns. The input port and the output port are connected to an IC which is called a keyboard encoder (IC1).

Following a keyboard scan routine, the encoder starts by enabling all output port (71) bits. The occurence of a zero at any bit of the input port (72) indicates the column of a contact closure. After that, each row is enabled by a strobe signal on the output port (71), one row at a time, until a switch is detected on the column inputs. It gives the row reference.

I propose to put on the ports (71) and (72) of encoder (IC1) a set of logical switches (77) which directs the pulses coming from the port (71) through a set of logical gates whose opening and closing simulates a contact closure in the keyboard matrix, toward the port (72) (see FIG. 2).

Figure 3:
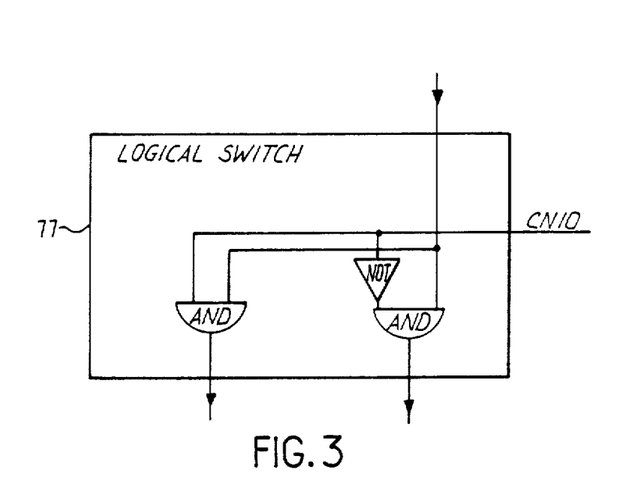
FIG. 3 is a diagrammatic representation of a component of FIG. 2.

Thus, it is necessary to divert the pulses from coming to the keyboard in order that the pulses come through the simulating device (51). The components (77) act like switching elements. In accordance with an embodiment, the components (77) include logical gates AND and NOT. According to the logical state of the CN10 wire, the output port is connected either to the keyboard (75) or to the simulating device (51) (see FIG. 3).

Once the ports (71) and (72) of the encoder (IC1) are connected to the simulating device (51), the device (51) may receive from the computer (1) through the cable CN21 the line coordinate of the key I want to simulate the closure, and also through the cable CN22 the row coordinate. The device (51) only allows the input of a signal on CN11 corresponding to the chosen line, and only allows the output of a signal on CN 12 corresponding to the chosen line. If necessary, the device (51) could include a synchronization unit with the encoder clock (IC1).

According to a specific embodiment, the simulating device (51) comprises:

1. cable CN11 which is constituted by parallel wires connected to the output port (71);

2. cable CN21 which is constituted by parallel wires connected to a port of UART (Usual Asynchronous Received Transmitter) (52); the set of the logical value of each wire describes the column coordinate;

3. cable CN22 which is constituted by parallel wires connected to another port of UART (52); the set of the logical value of each wire describes the row coordinate;

4. a set of AND gates (511); the two inputs of each AND gate is, respectively, one wire from cable CN11 and one wire from cable CN21; the outputs of the AND gates are connected to a unique wire (513);

5. a set of AND gates (512); the two inputs of each AND gate is, respectively, a wire connected to the unique wire (513), and another wire of cable CN22; the outputs of each of the AND gates are connected to multiple parallel wires cable CN12;

6. cable CN12 is connected to input port (72); and 7. a parallel serial data converter (52) such as an Universal Asynchronous Receiver Transmitter UART or a USART, which performs the translation between parallel data on its two parallel ports and the serial data coming from the modem (3) and the computer center (1).

So that the scanning pulse coming from the encoder (IC1) can pass through the emulating simulating device (51) only for the columns and rows the coordinates of which are loaded from the computer center (1).

An equivalent alternative of this scheme is to replace the AND gates (511) by OR gates followed by or preceded by NOT gates, according to MORGAN laws.

The input language, i.e., the set of the (B1) codes, are constituted by the coordinates of the keys associated with the actions performed by each key.

The (T1) and (T2) computations, in this embodiment, consist of assembling a list of (B1) codes in order to simulate the hand operating process onto the keyboard (75).

In accordance with this specific embodiment, it is possible to add the following devices in order that the user can know and verify which TV programs are scheduled to be recorded on his videorecorder:

1. the videorecorder (6) must have a display board (76) controlled by a display controller (IC2);

2. connection (78) onto the ports (73) and (74) of the display controller (IC2). These connections are permanent or are enabled through the wire (CN10); and 3. cables CN13 and CN14. At one end of the cables, there are connections (78), and at the other end there are the parallel ports of the UART (52).

The computer center (1) prepares (operation T4) interrogation control codes simulating the hand interrogation process on the keyboard. Then the computer center sends the codes to simulating device (51). Answering to this request, display controller (IC2) displays the hours, dates, channels or other references on the display board. Through the connections (78), the interface (5) can receive the data display (d) codes related to the scheduled TV program. The interface (5) then transmits the (d) codes to the computer (1). The codes (B2) are, in this embodiment, the codes used in the display unit.

Typical display controller (IC2) is a LED driver/decoder/demultiplexer. According to the LED display technique, the controller (IC2) has two output ports; one is the port (73) SEGMENT DRIVER related to the LED codes (usually 7 or 9 segments), and the other port is the port (74) DIGIT DRIVER. In this example of a specific embodiment, the (B2) codes are LED codes and, if necessary, the keyboard location codes.

This way of carrying out the interface (5) is interesting by the fact that it does not require important modifications on the timer (7). However, the transmission time may be a bit long.

There is also a very different way of carrying out the interface (5).

It is very likely that, more and more in the future, the timer (7) will include one or several buses, linking microprocessors and other components. A good example of a serial bus is the IC2 bus.

Figure 4:
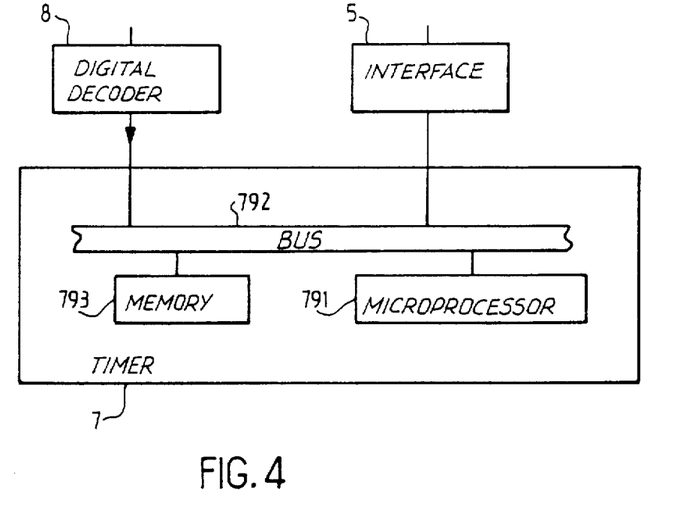
FIG. 4 is a diagrammatic representation of the layout of the electronic components of another example of a specific embodiment of the timer interface.

The timer (7) should comprise (see FIG. 4):

1. one or several microprocessor (791);

2. one or several bus (792); and 3. memories (793) in which are stored the data related to the TV programs' characteristics, such as the date, hour, channel reference, optionally as a most preferred embodiment identification codes (F).

The interface (5) should comprise a parallel or serial connection on the parallel or serial bus (792).

There could be a dedicated component which performs the data transfer between the bus (792) and the modem (3) or the microcomputer (41). The norm of the link with the modem (3) or the microcomputer (41) could be, for example, the low-priced TTL level MINITEL norm or the V24 or a domestic data bus such as D2B. According to an alternative solution, the data handling could be performed by one of the existing microprocessors, the software of which has been modified and increased.

In such an embodiment, the (B1) codes and the (B2) codes are the timer's microprocessor codes.

A way of making the link between the interface (5) and the modem (3) or the terminal (4) could be through a remote control with the help of infra-red waves. Use can also be made of radio waves or ultrasonic waves. Some VCR's have an infrared remote control of the scheduling functions. However, it is not a bidirectional data link unless a receiver and another emitter is added.

The real time start/stop recording apparatus interrelated with the data acquisition apparatus aforedescribed comprises the following additional elements (see FIG. 1):

1. One or several digital broadcast center (11); the data broadcast could be done while a TV or radio program is being broadcast or on a dedicated channel. The broadcast could be done over the air or over cables. One digital broadcast could be enough; for terrestrial TV emitters, a popular technique is to broadcast data during the blanking interval. On the same data broadcast resource, it is possible by time or packet multiplexing to put in several data channels. The channel (U) can be within a dedicated data channel, or within a video or radio channel.

2. The French system DIDON and the North American NABTS use the packet multiplexing technique during the blanking interval of a video broadcast, or within a full channel.

3. A center (11) broadcasts the (E) codes which are the signal upon which the appliances (6) such as videorecorders start or stop their recording of the scheduled programs. The broadcast is done onto a sole and unique channel (U), for a given territory. In short, there is one channel (U) to monitor all the existing TV or radio channels.

4. One or several monitoring center (12). The center (12) monitors the real start/stop time of the TV or radio programs. The monitoring center (12) is connected to the computer center (11) through a network or a dedicated telephone line. The monitoring center (12) is linked with center (11) which provides the characteristics of each TV program. According to one specific embodiment, monitoring center (12) comprises a room where there are as many TV sets as there are TV channels on the given territory. Controllers are watching permanently the progress of the TV programs. Before each controller, there is a computer terminal. The name of the next program to be aired is displayed on the screen, and the (E) codes related to this program are stored in memory. Each time a TV program begins, the controller pushes a key on the computer terminal which transmits the related (E) codes to the broadcast center (11) in order that the (E) code to broadcast immediately. With a VCR, when a program is about to begin, it is necessary also to broadcast another (E) code to get ready the tape onto the HF head. For convenience, the center (12) is located just nearby the center (11), and uses its hardware.

5. The data base (W) must include the (F) codes related to the TV programs of the next weeks. The (E) codes and the (F) codes are defined within the center (11), and not by the radio and TV companies. The (E) and (F) codes are internal and private codes reserved to the user who access to the center (11). The (F) codes help the timer (7) to identify the (E) codes related to the scheduled TV programs.

Each user's appliance (6) includes a digital decoder (8) able to receive and to decode the (E) codes.

The timer (7) of each user's appliance (6) is connected to the output of the digital decoder (8). Timer (7) is able, upon receiving an (E) code from digital decoder (8), to identify if the (E) code is related to a scheduled program. The identification is made with the help of the (F) codes which were stored and loaded previously through the interface (5) by the computer center (1). The timer (7), after proper identification of the (F) code, controls the start or the stop of the recording process.

In accordance with a most preferred embodiment, for example, in France, each territory could be the area where the national channels have the same frequencies. The size of the territory is now limited by the power of the terrestrial emitters. With a satellite, a sole (U) channel can encompass a whole European country and, in the United States, a whole coast.

If there is only a digital decoder (8) downstream the existing normal receiver (61), then only recording starts on real time is available. If there is a digital decoder (8) downstream, an additional receiver (9) on the (U) channel then the recording start, interruption, stop, on real time, are available. It could be possible also to use a multifrequency scanner receiver instead of the existing receiver (61) and the additional receiver (9).

In accordance with an example of a preferred embodiment in France, the technique of digital data broadcast is the DIDON technique. The broadcast center (11) includes a DIDON access point. The DIDON access point is connected to the monitoring center (12) through the data network TRANSPAC or a telephone line. In France, the DIDON technology is carried out by TDF. Specific microcircuits for DIDON are available from PHILIPS, THOMSON and TEXAS INSTRUMENTS.

In North America, the digital data broadcast could be done according to the transport level ISO 1 to 4 of the NABTS. It is almost the same as DIDON. Any TV emitter can act as a host to digital data broadcast equipment. The additional equipment requires almost no modification to the existing emitter and it is not expensive. To implement the most preferred embodiment of the system with a sole (U) channel, it is only necessary to find one television or even radio emitter for a whole territory or area.

Before implementing the real time start/stop recording system, it is necessary to implement the data acquisition system afore-described. There is no other way. So, the method to implement the real time start/stop system comprises the following steps which have to be added to the steps of the different acquisition methods aforedescribed.

Periodically, once a week or more, depending on how much time in advance the TV or radio schedules are known, the method comprises the following additional steps:

1. A code (E) is defined for each TV or radio program of the next weeks. The definition of the (E) codes and the definition of TV or radio programs is made independently by the monitoring center (12). It is thus possible to cut up a TV program into different subprograms. In a magazine, the user could select only the subprograms he is interested in and get rid of the advertisements.

2. For each code (E), an identification code (F) is defined; the (F) code is used by timer (7) to identify the (E) code relative to a specific TV or radio program. The code (F) is independently defined by the monitoring center (12).

3. The (F) codes are appended to each TV or radio program or subprogram data characteristics in the data base (W). In an example of embodiment, the computer or computers of the center (1) are the same as those of the monitoring center (12).

Each time the user accesses to the computer center (1) or uses the microcomputer (4) which have been loaded before by the center (1), in order to schedule the TV or radio programs he wants to record.

4. The (F) identification codes are required to be included within the (c) codes sent to the interface (5) and the timer (7). Only with the help of the (F) codes can the timer (7) identify the broadcast (E) codes.

In a permanent way, all the time while there is still a TV or radio program on the air. For example, with regard to the TV programs, the monitoring center would be in charge, in France, from 8 AM to 1 AM; in the United States, 24H/24H all the time.

5. The personnel of the monitoring center (12) watch carefully at the actual and real TV or radio programs time-scheduling execution. The controllers detect when a program is beginning or ending or being interrupted.

6. When a TV or radio program start or end is detected, the monitoring personnel transmits to the digital data broadcast center (11), the (E) code related to the program. The center (11) immediately broadcasts the (E) code.

7. Upon receiving and identifying an (E) code with the help of an (F) code related to a scheduled program, the timer (7) controls the start of recording, and as an option, the timer (7) also controls the stopping of recording.

In accordance with another embodiment, the (E) codes related to a program are broadcast permanently for all the duration of the program. The (E) codes could comprise the updated start and end times of the program. According to an alternative solution, the (E) codes could comprise only an identifier. Only when the (E) codes related to a program are received, the videorecorder is recording the program. These two solutions are not likely to be the best ones because they use a high volume of broadcast data.

In a most preferred embodiment, each (E) code is broadcast only when the program starts, begins or is interrupted. Each (E) code is broadcast repetitively several times, such as ten times, in order to insure a good reception.

In an embodiment, when the videorecorder does not include an additional receiver (9) or is not able to receive two channels at the same time, the real time start/stop recording step process is the following:

1. The receiver (61) of the videorecorder (6) listens to the (U) channel either permanently or only since the forecast time of the scheduled program or a little earlier.

2. The digital decoder (8) receives and sorts out all the incoming codes, and then transmits all the codes of the (U) channel to the timer (7). When the timer (7), with the help of the stored (F) code, identifies the (E) code related to the beginning of a scheduled program, the receiver (61) switches on the channel of the beginning program. The videorecorder then begins to record.

3. The videorecorder stops its recording only with the help of the scheduled duration of the program. As an option, the scheduled duration can be updated at the last moment, within the (E) code related to the beginning of the program.

In another embodiment, when the videorecorder does include an additional receiver (9), or is able to receive two channels at the same time with a device like a multifrequency scanner receiver, the real time start/stop recording step process is the following:

1. The additional receiver (9) of the videorecorder (6) listens to the (U) channel either permanently or only since the forecast time of the scheduled program or a little earlier.

2. The digital decoder (8) receives and sorts out all the incoming codes, and transmits all the codes of the (U) channel to the timer (7). When the timer (7), with the help of the stored (F) code, identifies the (E) code related to the beginning of a scheduled program, the videorecorder begins to record with the receiver (61). The additional receiver (9) keeps on listening to the (U) channel.

3. Upon receiving on the (U) channel an (E) code related to the interruption of the program, the recording of which is in progress, then the videorecorder keeps recording. The additional receiver keeps on listening on the (U) channel.

4. Upon receiving on the (U) channel an (E) code related to the end of the interruption of the program, then the videorecorder again begins to record. The additional receiver keeps on listening on the (U) channel.

5. Upon receiving on the (U) channel an (E) code related to the end of the program, then the videorecorder stops recording. The additional receiver stops listening on the (U) channel. The videorecorder is switched off.

If the videorecorder is connected to another receiver of another appliance (e.g., a TV set) but may not use it all the time, it is possible to consider the following combination:

1. When the user does not use the other applicance (TV set), the recording is made as if there were an additional receiver.

2. When the user does use the other appliance (TV set), the recording is made with only the existing receiver.

This could make economical sense, but the power on/off of the other appliance has to be controlled by the timer (7) of the videorecorder.

In an example of an embodiment wherein the appliance (6) is a videocartridge recorder, it is necessary to send before beginning to record a "ready to record" (E) code in order to prepare the magnetic tape before the HF head.

If the videorecorder (6) includes an additional receiver, then if either, according to their forecast times, two programs are on the same time on different channels, or if there is a risk that two programs may be on the same time, in case the first program is slightly late, it is possible to consider a priority management scheme:

1. When, with the help of the data acquisition system afore-described, the user schedules the programs he wants to record, he defines within the (F) codes a priority level for each program with potential timing problems.

2. If, recording a first program, the additional receiver receives an (E) code related to the beginning of another second scheduled program, then the timer (7) compares the priority level set in the (F) codes of the first and second programs. If the priority level of the second program is higher, then the videorecorder stops recording the first program and starts recording the second program. If the priority level of the second program is lower or equal, then the videorecorder keeps on recording the first program. In a sophisticated embodiment, the timer (7) can keep in memory to start recording the second program as soon as the first one is finished.

As an optional feature, it is possible to broadcast (E) codes at the forecast beginning time of a program, when a program is supposed to start. These (E) codes would be related to a forecast time acknowledge of the program. The timer (7), if not receiving the acknowledge (E) codes, would then control the recording process the old fashioned way. However, the reliability would not be enhanced, because it is much more likely that the clock of the timer is not on time, then the data broadcast center does not work. If, for any reason, the monitoring center (12) is not monitoring a local or unknown television or radio channel, then when the user accesses to the computer center (1), the schedules of the channel are not displayed to the user. No (F) codes are loaded, and the user knows this fact. There is no misunderstanding because the data acquisition system and the real time start/stop system are closely interrelated. The user is always free to record the program of the television channel with the old fashioned hourly way.

In accordance with a most preferred embodiment, an (E) code comprises two data fields:

1. An identifier, number or alphanumeric, of the scheduled program.
2. A function field describing the following functions on an (E) code, ready-to-record (for VCR), start, interruption, end-of-interruption, and stop, forecast-time-acknowledge (option).

As an option, the updated duration of the program can be appended to the (E) code with a start function, in order to be used by videorecorders with only one receiver.

The (F) codes comprise two data fields:
1. An identifier of the program.
2. An optional function field describing the priority level, the interruption, and ignore mode. If this mode is enabled, the (E) codes related to interruptions are ignored.

The proposed system offers a real advantage to the user. Furthermore, the videorecorder manufactures can implement the system quickly, easily, cheaply and independently.

Notice MAVICA is a video picture recording system from SONY.

TRANSPAC, TELETEL, PERITEL, MINITEL are demonitions of the French P.T.T.

EPEOS, MOISE are demonitions of the C.C.E.T.T.

DIDON, ANTIOPE are demonitions of the French National broadcast agency T.D.F.

CEEFAX is digital data broadcast system from the B.B.C.

VIDEOTEX is a specification of interactive videography from the C.C.I.T.T.

V.P.S. (Video Programming System) is a real time start/stop recording system from the Federal channels ARD/ZDF in West Germany.

I2C and D2B are serial bus standards set by PHILIPS.

While there have been shown and described what are considered to the the preferred embodiments of the ivention, it is understood that various modifications and changes can be made without departing from the spirit and scope of the invention.

What is claimed is:

1. An acquisition and transmission system between a video/audio recorder and a server computer center of special data related to a scheduling of a recorder, comprising:

a computer center (1) including memories, codes A being stored in said memories for establishing a link between an interface (5) and said computer center;

an interactive data network (2) to which is connected said computer center (1);

said computer center (1) including memories in which are stored input language codes (B1) and output language codes (B2) of said interface (5);

said computer center including additional memories in which are stored a data base (W) which contains characteristics of TV or radio programs of next weeks, such as a channel reference, a forecast hour and, optionally, an identification code (F) of a real time start/stop broadcast code (E);

said computer center including further memories in which are stored a set of instructions describing different methods of implementing the system;

each user including:

a modem (3) connected to said data network (2), a terminal (4) including means for data acquisition, means for data display, and means for connection to said modem (3), means (6) for receiving and recording independently video or audio programs broadcast by television or radio companies, respectively, and including a timer (7), and said interface (5) interfacing said timer (7) with either said modem (3) or said terminal (4).

2. The system of claim 1, further comprising:

digital data broadcasting means (11) for broadcasting digital data broadcast codes (E) related to a real start/stop time of the programs produced by television or radio emitting facilities, said digital data broadcast codes (E) being broadcast on a specific (U) channel, as regards a given territory;

means (12) for monitoring a real time start/stop of programs broadcast by television or radio facilities over air or cables;

means for connecting said digital data broadcasting means (11) to said monitoring means (12);

means for connecting said monitoring means (12) to said computer center (1);

identification (F) codes related to each program of next weeks, wherein said identification (F) codes help to identify digital data broadcast codes (E) related to each television or radio program, wherein said identification (F) codes are included in a data base (W); and each user including:

means for receiving and decoding said digital data broadcast codes (E) broadcast on a (U) channel, said timer (7) being connected to an output of said digital receiving means and including memories in which are stored the identification (F) codes of the scheduled programs, and said timer (7) including means for controlling a start/-stop of a recording process, upon receiving a digital data brodcast code (E), of said digital data broadcast codes (E) identified by an (F) identification code of said identification (F) codes.

3. The system of claim 2, wherein said digital receiving and decoding means comprise a digital decoder (8) connected to an output of an existing receiver (61) included in said means (6) for recording and receiving either video or audio programs, wherein said existing receiver (61) cannot receive two channels simultaneously.

4. The system of claim 2, wherein said digital receiving and decoding means comprise a digital decoder (8) connected to an output of said receiving means, wherein said receiving means can receive said (U) digital channel while receiving another video or audio program on another channel.

5. The system of claim 1, wherein said terminal (4) includes memories and means for processing autonomously when disconnected from said computer center (1).

6. The system of claim 1, wherein said interface (5) include means for receiving and emitting electromagnetic waves, specifically infra-red waves or ultrasonic waves.

7. The system of claim 1, wherein said interface (5) comprise:
- logical switches (77) coupled with an output port (71) and coupled with an input port (72) of an encoder (ICI) of a keyboard (75) of said timer (7), wherein said output port (71) is connected to a parallel cable (CN11) and wherein the input port (72) is connected to a parallel cable (CN12), and wherein said logical switches are enabled by a wire (CN10);
- an emulating circuit (51) simulating or emulating said keyboard (75), including one output port connected to said cable (CN11), an output port connected to cables (CN21) and (CN22), respectively, wherein said circuit (51) only allows an input from wires of said cable (CN11) corresponding to a logical binary value of wires from cable (CN21), and only allows an output from wires of said cable (CN12) corresponding to the logical binary value of the wires of cable (CN22); and
- a series/parallel data converter (52) connected to the parallel cable (CN21) and the parallel cable (CN22), and connected through a serial link to said modem (3) or said terminal (4).

8. The system of claim 7, wherein said emulating circuit (51) includes:
- said parallel cable (CN11) which is constituted by parallel wires connected to said output port (71);
- said parallel cable (CN21) which is constituted by parallel wires connected to a port of said data converter (52) wherein the set of the logical values of each wire describes a column coordinate;
- said parallel cable (CN22) which is constituted by parallel wires connected to another port of said data converter (52) wherein a set of the logical values of each wire describes a row coordinate;
- a first set of AND gates (511) including at least two AND gates, each of said AND gates having two inputs, said two inputs of each said AND gate of said first set of AND gates is, respectively, a wire of said parallel cable (CN11) and a wire of said parallel cable (CN21), and wherein outputs of said first set of AND gates are connected to a unique wire (513);
- a second set of AND gates (512) including at least two AND gates, each of said AND gates having two inputs, said two inputs of each said AND gates of said second set of AND gates includes, respectively, said unique wire (513) and a wire of said parallel cable (CN22), and wherein each output of said second set of AND gates is connected to multiple parallel wires of said parallel cable (CN12); and said parallel cable (CN12) being connected to said input port (72).

9. The system of claim 7, wherein said interface (5) includes:
- connections (78) onto ports (73) and (74) of a display controller (IC2), said connections (78) being permanent or are enabled through said wire (CN10); and
- parallel cables (CN13) and (CN14) connected with said connections (78) and with parallel ports of said converter (52).

10. The system of claim 1, wherein said timer (7) includes:
- at least one microprocessor (791);
- at least one bus (792); and
- memories (793), wherein data related to scheduled program characteristics are stored.

11. A method of acquiring and transmitting special data related to scheduling of a recorder between a video/audio recorder, comprising the steps of:
- establishing a link between a computer center (1) and an interface (5) with addressing codes (A);
- reading a data subset (w) of a data base (W), wherein said subset (w) describes characteristics of a scheduled program selection to be recorded;
- preparing and assembling (operation T1) control codes (c) of said interface (5) and a timer (7), with codes (B1), wherein the control codes (c) are related to a subset (w); and
- transmitting the control codes (c) over a network (2) to the interface (5) through a modem (3).

12. The method of claim 11, comprising the steps of:
- reading, periodically, a whole data base (W), and assembling operation (T2) a set of control codes (C), with codes (B1), wherein said set of control codes (C) are related to each program of the data base (W), and wherein each element of the set of control codes (C) is appended to each related element in the data base (W);
- reading, in the data base, the data subset (w) and an appended subset code (c) of the set of control codes (C), wherein the subset (w) describes the characteristics of a scheduled program selection to be recorded; and
- transmitting the subset code (c) over the network (2) to the interface (5) through the modem (3).

13. The method of claim 11, comprising the steps of:
- sending controls to the interface (5) so that the timer (7) reads a content (d) of its memories in which are stored characteristics of scheduled programs; and
- transmitting the content (d) of the memories of timer (7) to the computer center (1);
- disassembling the data content (d) of the memories of timer (7), with the help of codes (B2) and the data base (W);
- extracting a subset (w) describing the characteristics of scheduled programs; and
- transmitting the data subset (w) to a terminal (4) for display.

14. The method of claim 11, comprising the steps of:
- loading the data base (W) to an autonomous terminal (4) periodically from the computer center (1); and
- said autonomous terminal (4) after loading replacing the computer center (1) in the processing steps.

15. The method of claim 11, comprising the further steps of, once, for a period of time:
- defining an (E) start/stop broadcast code for each program of the period;

defining an (F) identification code related to the (E) broadcast code, wherein the (F) code is used to identify the (E) code; and including in the data base (W) the (F) identification code with characteristics of a program, each time a user accesses the computer center (1) or an autonomous terminal (4); and including identifications codes (F) with control codes (c) sent to the interface (5); and, in a permanent way:

monitoring the real time start/end of programs;

transmitting and broadcasting over a (U) channel the (E) codes related to the start or end of monitored programs; and controlling starting or stopping of a recording means (6), upon receiving and identifying an (E) code by means of an (F) code related to a scheduled program.

16. The method of claim 11, including:

receiving, sorting out and transmitting codes of a (U) channel to the timer (7);

identifying a broadcast start (E) code related to a scheduled program with a stored (F) identification code; and recording said program; and ending said program recording in response to a scheduled duration of said program to control starting and stopping of said program.

17. The method of claim 11, wherein controlling starting or stopping of recording means (6) comprises the steps of:

receiving, sorting out and transmitting codes of a (U) channel to a timer (7);

identifying a broadcast start (E) code related to a scheduled program with a stored (F) identification code; and keeping on receiving a (U) channel while beginning to receive the channel on which a beginning program is broadcast; and recording said scheduled program to start a recording process;

interrupting the recording process, upon receiving an (E) interruption code identified with the (F) code related to said scheduled program; and keeping on receiving a (U) channel;

re-starting the recording process, upon receiving an (E) end-of-interruption code related to said scheduled program;

stopping the recording process, upon receiving an (E) stop code related to the end of said program.

18. The method of claim 11, including the steps in which an (E) code comprises the following data fields:

an identified field of the program;

a function field describing the following functions: ready-to-record (option for videocartridgerecorder), start, interruption, end-of-interruption, stop, forecast-time-acknowledge (option), scheduled duration (option);

and wherein an (F) code comprises the following data fields:

an identifier field of the program; and an optional function field describing a priority level and an interruption ignore mode.

19. A system for providing scheduling signals exchange by means of a network linkage between a host facility and a user terminal and a recorder, comprising:

(A) a host facility, including:

(1) a host computer having an index memory for retaining characteristics of television or radio programs for a selected future period with textual data descriptive of television or radio programs for the selected future period, one of the retained characteristics being a channel reference, another of the retained characteristics being a planned start time, a further of the retained characteristics being a planned termination time or duration of the television or radio programs, said host computer being under control of host programs for effecting signals transmitted over said network; and (2) a host network connection means coupled between said host computer and said network linkage;

(B) a user terminal and recorder, comprising;

(1) a terminal computer means including terminal processor means, terminal display means, terminal key acquisition means, and terminal local peripheral interface means;

(2) a terminal network connection means coupled between said terminal computer means and said network linkage;

(3) means placing said terminal processor means under control of a terminal input program receiving signals from said terminal network connection means, said terminal input program being configured for directing incoming signals either to said terminal display means or to said terminal local peripheral interface means or both of them, by said terminal network connection means of a predetermined command code sent by said host computer over said network linkage; and (4) means placing said terminal processor means under control of a terminal output program, transmitting incoming signals toward said terminal network connection means for transmission over the network to said host network connection means, said terminal output program being configured for receiving aid incoming signals either from said terminal local peripheral interface means or from user key acquisition means by said terminal network connection means of a predetermined command code sent by said host computer over said network linkage; <(5) user program receiver for receiving video or audio programs broadcast through air or cable by television or radio emitting facilities;

(6) user recording means connected to an output of said user program receiver, for recording autonomously video or audio programs, including a timer, recorder interface means, and having a timer memory for retaining said characteristics of the programs scheduled to be recorded; and (7) means connecting said recorder interface means between said timer and said terminal local peripheral interface, for exchanging signals with said terminal local peripheral interface, said timer being responsive to predetermined scheduling timer command codes received through said recorder interface means, for writing in said timer memory specific characteristics of television or radio programs, arriving at said recorder interface means, assembled with said predetermined scheduling timer command codes;

C. said host computer including:

(1) a memory for retaining said scheduling timer command codes;

(2) an interactive display program for controlling said host computer for selectively retrieving said textual data descriptive of said television or radio programs for a selected future period in said index memory, and for sending the retrieved textual data over the network by said host network connection means, by said terminal connection means, onto said user display means, said interactive display program being configured to be responsive to signals coming from said user key acquisition means for selecting a user specific subset of said television or radio programs;

(3) a timer control program associated with said interactive display program, for retrieving in said index memory the characteristics of the television or radio programs which belong to the above-selected said user specific subset of programs; and (4) said timer control program being configured for retrieving in memory said scheduling timer command codes, for sending a predetermined code to said terminal processor means under the control of said terminal input program for directing signals arriving at said terminal network connection means toward said terminal local peripheral means, and subsequently for sending the characteristics of above-selected said user specific subset of programs, assembled with said scheduling timer command codes, by said host network connection means, over said network linkage, by said user terminal network connection means, by said user terminal local peripheral interface means, to said recorder interface means.

20. The system of claim 19, including:

recording processing means responsive to predetermined priority acquisition command codes, received through said recorder interface means, for writing in recognition codes memory, a specific priority level of each program, arriving at said recorder interface means, assembled with said priority acquisition command codes; and a recorder command program configured, when retrieving recognition codes in a recognition code memory, for retrieving a priority level corresponding to the program, the recognition code of which was retrieved; and wherein said recorder command program is configured, when deriving from said particular real time recording actuation codes said specific attention signal, for comparing the priority level of the program being possibly recorded and the priority level of the program, the real time actuation code of which is received;

said recorder command program being subsequently configured, when the priority level of the program being recorded is higher or equal, for ignoring the particular real time actuation codes corresponding to the program with a lower priority;

said recorder command program being subsequently configured, if the recorder is a video cartridge or tape receiver, when the priority level of the program being recorded is lower, in response to the derived particular attention signal keyed when the higher priority program is about to start, for terminating the recording process, for setting the channel on which the higher priority program is scheduled to be recorded, and for setting the tape nearby the read/write head;

said recorder command program being subsequently configured, when the priority level of the program being possibly recorded is lower, in response to the derived particular attention signal keyed when the higher priority program is starting, for terminating the recording process, for setting the channel on which the higher priority program is scheduled to be recorded, and for letting the recorder start to record;

said host computer interactive display program being configured to be responsive to signals coming from said user key acquisition means for selecting each program of the said user specific subset of program, a priority level;

said host computer having a memory for retaining said priority acquisition command codes; and said timer control program being configured for retrieving said priority acquisition command codes, for sending subsequently to the said recognition codes of the then selected said user specific subset of program, the priority levels of each program of said subset, assembled with said priority acquisition command codes, by said host network connection means, over said network linkage, by said user terminal network connection means, by said user terminal local peripheral interface means, to said recorder interface means.

* * * * *